Jan. 14, 1964   M. RINGLER   3,117,626
DEVICE FOR CUTTING BORE HOLE PIPES
Filed June 28, 1962
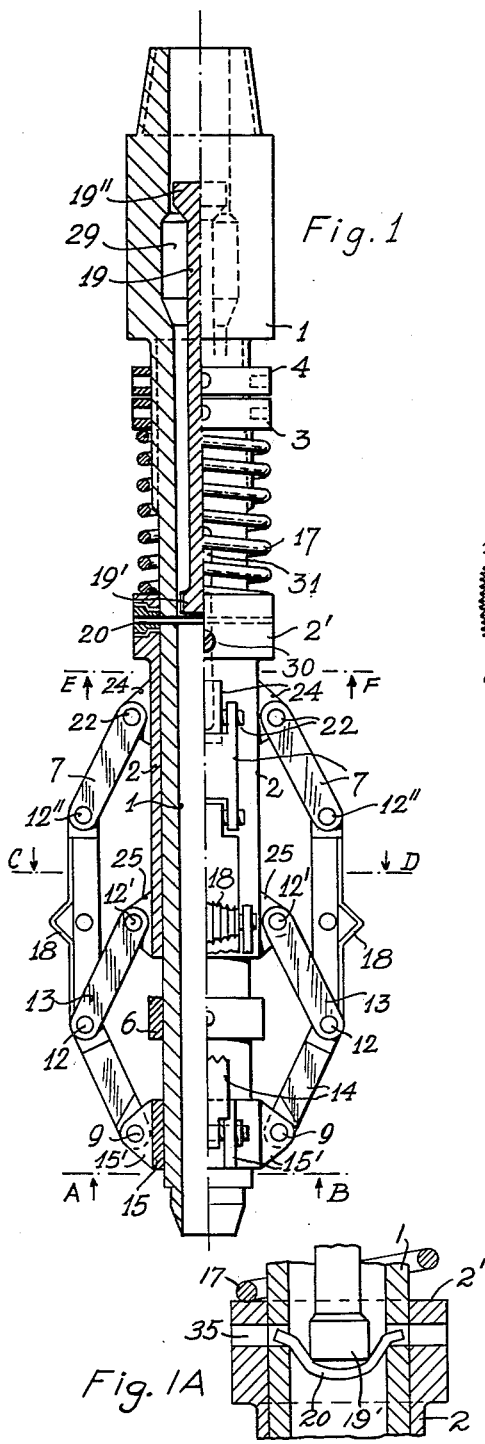
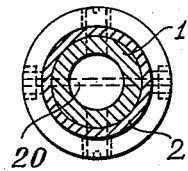
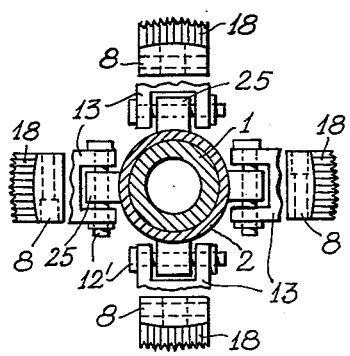
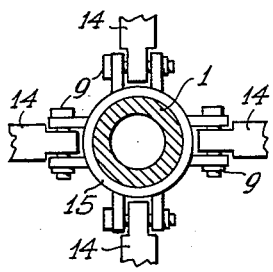
INVENTOR.
MAURYCY RINGLER
BY *Fredrick L. Haug*
ATTORNEY

United States Patent Office 3,117,626
Patented Jan. 14, 1964

3,117,626
DEVICE FOR CUTTING BORE HOLE PIPES
Maurycy Ringler, 3 Beth Oren St., Yad Eliahu,
Tel-Aviv, Israel
Filed June 28, 1962, Ser. No. 206,094
Claims priority, application Israel July 28, 1957
4 Claims. (Cl. 166—55.7)

The present invention relates to a device for cutting pipes in bore holes. In sinking a well, pipes are successively lowered into the bore and when a well is abandoned it is sometimes necessary to cut the pipe at some point down in the hole so as to be able to retrieve it therefrom. The cutting has to be performed from the inside of the pipe which means that the cutting tool has to be lowered within the pipe to be cut and has to be brought into operative position when it has arrived at the exact location of the cut.

The application is a continuation-in-part application of my copending application Serial No. 749,113, filed July 17, 1958, now abandoned.

It is therefore the object of the invention to provide an improved device for cutting pipes lowered into a borehole.

It is a further object of the invention to provide a tool which can easily be lowered and can be brought into cutting position by being controlled from above and which, after having cut the pipe, can easily be retrieved from the borehole.

These and other features of the invention will become clear from the following description with reference to the annexed drawings.

According to the invention the new cutting implement comprises a hollow shaft near one end of which there are provided on the circumference of the shaft and spaced from each other a number of linkages carrying milling cutters, said linkages being adapted to be spread apart, thereby uniformly moving the said milling cutters radially away from the shaft, said linkages being urged to spread apart by means of a slidable spring-biased sleeve slid on the shaft, arresting means being provided for counteracting temporarily the bias of the spring during the lowering of the device into a borehole and means for releasing the said arresting means at will.

In a practical form of the invention the said arresting means consist of a pin diametrically passing through the hollow shaft and retaining the spring from acting on the said linkages, while the means for releasing the said arresting pin comprise a piston moving in the hollow shaft above the pin, said piston having a centrally recessed lower face so as to form a circular working edge adapted to act on the pin lying in the path of the piston within the hollow shaft, the arrangement being that with the introduction of fluid into the hollow shaft the piston is pressed unto the arresting pin, pushing it downwards and thereby releasing the spring, permitting it to act on the linkages.

The invention will now be described with reference to the annexed drawing showing the new tool in FIGURE 1 in an axial elevation, partly in section.

FIGURE 1A is a fragmentary view of FIGURE 1 on an enlarged scale.

FIGURE 2 is a section on line C—D of FIGURE 1;

FIGURE 3 is a section on line A—B of FIGURE 1, and

FIGURE 4 is a section on line E—F.

On a hollow shaft 1 is held a sleeve 2 having an upper flanged collar 2'. A set screw 30 extends through collar 2' and is axially movable within a longitudinal slot 31 in shaft 1, the slot being indicated in dashed lines in FIG. 1. Thus an axial movement between sleeve 2 and shaft 1 is possible while a turning movement between them is prevented. Further upon on shaft 1 there are provided two rings 3, 4 which can be fixed to the shaft by means of set screws 3', 4'. Between collar 2' and ring 3 is slid on the shaft a spring 17 which, by adjusting the rings 3, 4 up or down, can be tensioned to a greater or smaller extent. At the lower end of sleeve 2 there is provided on shaft 1 a further ring 6 which may be moved to or fro, that is to say urging the sleeve 2 upwards against the tension of spring 17 or allowing it to move downwards. By means of rings 3, 4 and 6, therefore, the sleeve 2 can be moved up or down on shaft 1 within certain limits and held at the chosen place. Near the lowermost end of shaft 1 there is fixed on it a circumferential collar 15 having circumferentially disposed thereon four eyes 15'. To each of these eyes is linked by pins 9 a link 14 constituted by a flat strip of steel. Links 14 are connected over pins 12 with similar links 13 which in turn, at their opposite ends, are connected by pins 12' to eyes 25 fixedly arranged on the lowermost end of sleeve 2, just above ring 6. To links 14, and by means of said pins 12, are further connected links 8 which at their upper ends are connected by pins 12'' to links 7, in turn connected over pins 22 with eyes 24 on sleeve 2 just below collar 2'. Connection points, that is, eyes 15', 25 and 24 and the links between them are positioned in a vertical line above each other. Four such vertical lines are evenly distributed around the shaft, that is, separated by 90°. Links 8 carry at their outside milling cutters 18.

Through collar 2' and across the hollow shaft 1 passes a thin and relatively weak pin 20 which restrains the collar 2' and thus sleeve 2 against axial movement on shaft 1. The pin is inserted in a bore 35 (see FIG. 1A) extending through the collar and the hollow shaft. It may be simply a piece of wire or a thin bar inserted in the bore. In actual practice the workman in the field will use any suitable piece of material that is on hand and will fit in bore 35. In the hollow shaft there is movable a piston 19 the lower end 19' of which abuts against pin 20.

It will be seen that every linkage comprising links 7, 8, 14 will shorten in length, thereby moving cutters 18 apart, whenever sleeve 2 moves downwards towards the fixed collar 15. This is the case in view of the fact that links 14 are fixed at 9. Contrarily, with the upward movement of the sleeve 2 the linkage will contract diametrically and will lengthen. Thus in its position of smallest diameter, that is, with sleeve 2 in uppermost position, and spring 17 being prevented by pin 20 from pushing sleeve 2 downwards, the tool can easily be lowered into a borehole pipe. When it has arrived at the position of a cut to be made, drilling fluid will be pressed into the hollow shaft, thereby forcing piston 19 downwards causing it to strike on pin 20. Under the impact of the piston, the pin will be bent downward at its central portion into some kind of U-shape and, by this deformation, pulls its end in inward direction out of the holes in collar 2' and shaft 1 respectively. FIG. 1A shows a stage of the operation in which the ends of the pin have left collar 2' but are still within the hole of shaft 1. When the ends of the pin have cleared the hole in collar 2', the latter will yield to the pressure of spring 17 and the collar together with sleeve 2 will be pushed down by the spring as previously described. Pin 20 after being pulled out of shaft 1 also will fall down into the bore hole. It is, of course, also possible that the pin is cut by the descending piston, in which case the pieces of the pin will also fall out of the hole. It is only essential that the piston renders the pin ineffective in some fashion when the drilling fluid is fed into the hollow shaft as previously described. Due to the downward movement of sleeve 2, the aforedescribed links are spread, thereby pressing the milling cutters 18 against the inside of the borehole pipe.

Now by means of a shaft, as usually attached to the upper end of the tool, the whole tool is rotated so that the cutters 18 will cut through the wall of the pipe, with the result that the cut portion of the pipe can be pulled up with a casing spear, known as such.

In order to set the tool for the next use, rings 3, 4 and 6 are loosened, a fresh pin 20 is inserted whereupon all rings are fixed in position according to the requirements of the case.

Piston 19 is movable within shaft 1 for a certain distance only which, however, is sufficient for rendering pin 20 ineffective. The bore of shaft 1, in the region of piston 19, is of unequal width, the rear (upper) part being wider than its forward (lower) part. Between the two parts a still wider portion 29 is provided. Accordingly, piston 19 has a front portion 19' of narrower diameter and a rear portion 19" of wider diameter. When being pushed by the pressure fluid piston 19 will move downward until portion 19" abuts against the edge of the narrower part of the bore. Thus the piston is prevented from falling downwards.

What I claim is:

1. In a device for cutting bore hole pipes lowered into a bore hole, the combination comprising a hollow shaft having a longitudinal bore extending at least partly along the length thereof, a plurality of radially outwardly expandible link assemblies secured in circumferentially spaced apart relationship upon said hollow shaft adjacent to one end thereof, each of the assemblies including a link occupying the farthest radially outward position when said assemblies are expanded, a milling cutter carried upon each one of said link assemblies, on that link of the assembly arranged to extend into the farthest radially outward position, a sleeve being slidably supported upon said shaft, a part of each of said link assemblies being pivotally secured to said sleeve to control the radial movement of said link assemblies by the lengthwise position of said sleeve, spring means acting between said sleeve and said shaft to bias said sleeve into a lengthwise position in which said link assemblies occupy a radially outwardly expanded position, and an arresting means carried by said shaft acting against said spring means and releasably counteracting them.

2. In a device as set forth in claim 1, wherein said arresting means comprises a pin extending diametrically through said shaft and said sleeve for releasably securing said sleeve against longitudinal movement along said shaft.

3. In a device as set forth in claim 2, further comprising a piston slidably supported within the upper end of said longitudinal bore of said shaft, said piston having one end in abutment with said pin for movement toward the lower end of said bore and being adapted to render said pin ineffective for counteracting said spring means.

4. In a device as set forth in claim 3, wherein said upper end of said longitudinal bore of said shaft is of a reduced diameter beyond the stroke of said piston toward the opposite end of said bore.

References Cited in the file of this patent

UNITED STATES PATENTS

| | | |
|---|---|---|
| 1,106,983 | Steiner | Aug. 11, 1914 |
| 2,053,698 | Church | Sept. 8, 1936 |
| 2,214,320 | Brown | Sept. 10, 1940 |
| 2,290,000 | Scivally | July 14, 1942 |
| 2,660,240 | Ringler | Nov. 24, 1953 |